July 26, 1955

C. W. KELL ET AL 2,713,948

RAILWAY VEHICLE AIR LINE MOUNTING

Filed Aug. 21, 1952

INVENTORS
Clement W. Kell
Thaddeus W. Bdgajny
By Rodney Bedell

July 26, 1955  C. W. KELL ET AL  2,713,948
RAILWAY VEHICLE AIR LINE MOUNTING
Filed Aug. 21, 1952  2 Sheets-Sheet 2

INVENTORS
Clement W. Kell
Thaddeus W. Podgajny
By Rodney Bedell
Atty.

United States Patent Office 2,713,948
Patented July 26, 1955

2,713,948

RAILWAY VEHICLE AIR LINE MOUNTING

Clement W. Kell, Ridley Park, Pa., and Thaddeus W. Podgajny, Wilmington, Del., assignors to General Steel Castings Corporation, Granite City, Ill., a corporation of Delaware Application August 21, 1952, Serial No. 305,614

8 Claims. (Cl. 213—1)

The invention relates to railway rolling stock and more particularly to the mounting of the train line air hose at the end of a vehicle and adjacent to a laterally swinging coupler. The invention resides in the provision of structure whereby swinging of the coupler laterally of the vehicle to a greater extent than has been customary may be accommodated without departing from the American Association of Railroads (A. A. R.) standards of train line spacing relative to the center line of the vehicle and the coupler pulling face.

Railway cars using A. A. R. standard coupler usually have an air line pipe secured to the framing by a clamp at the end of the car and there provided with an angle cock to which is attached the upper end of a hose connection, the lower end of which is adapted to be attached to a corresponding hose connection on an adjacent vehicle. To avoid dragging of the lower end of the hose connection upon the road bed, if it is not attached to the hose connection of an adjacent vehicle, and, at the same time, to provide sufficient slack for the attached hose connections of adjacent vehicles to accommodate lateral movement of the ends of the framing on curved track, A. A. R. standards specify the length of the hose connection and the spacing of the pipe bracket from the center line of the vehicle.

The main object of the invention is to suspend the air line at the end of the vehicle from a swinging hanger so that it will not interfere with the coupler when the latter moves a maximum distance transversely of the vehicle and, at the same time, will not be spaced from the center line of the vehicle, when the vehicle is on straight track, a greater distance than specified in A. A. R. standards.

Another object of the invention is to avoid chafing of the air piping or other injury due to contact between the line and the coupler.

These objects are attained by the structure illustrated in the accompanying drawings, in which.

Figure 1:
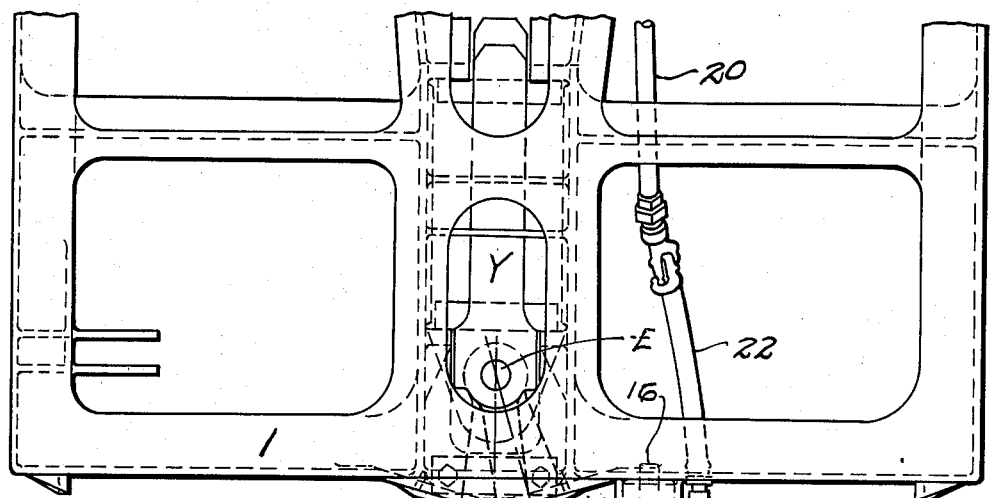
Figure 1 is a top view of one end of a vehicle underframe.
Figure 2:
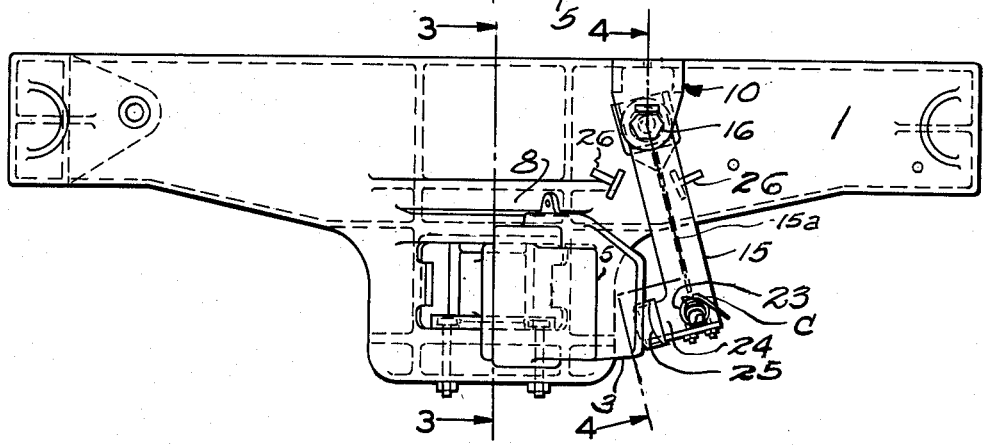
Figure 2 is a front view of the structure shown in Figure 1.
Figure 3:
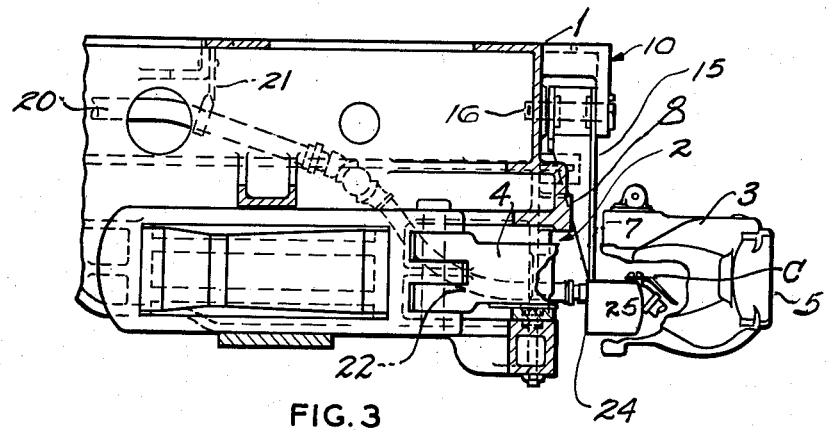
Figure 3 is a vertical longitudinal section taken on the line 3—3 of Figure 2, with part of the coupler omitted.
Figure 4:
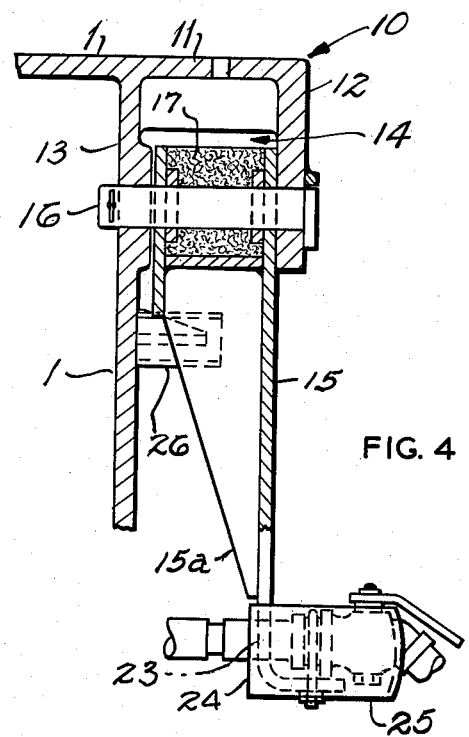
Figure 4 is a detailed vertical longitudinal section taken on the line 4—4 of Figure 2.

The vehicle end framing shown in the drawings includes an end sill 1, the intermediate portion of which forms a forwardly opening pocket 2 adapted to receive a coupler including a head 3, a shank 4, pivoted at E to a a draft gear yoke Y, a knuckle 5, a lateral guard arm 6, and an upstanding horn 7, disposed to abut the forward face 8 of the end framing which constitutes a striking plate.

Spaced laterally from pocket 2 and above the level of the pocket is a bracket 10, preferably formed integral with the end sill and including a top wall 11, side walls 12, 13 and forming a downwardly opening recess 14. A hanger 15 has its upper end received in recess 14 and is suspended from bracket 10 by a pivot pin 16, extending lengthwise of the vehicle. Preferably the upper end of hanger 15 is cup-shaped and is filled with an absorbent, fibrous material 17, surrounding pin 16 and adapted to be saturated with oil to lubricate the bearing surfaces of the pin and hanger.

A train line air pipe is shown at 20 and has a fixed support 21 spaced inwardly a substantial distance from the end of the framing. An air hose 22 has its inner end secured to the forward end of pipe 20 and has its forward end extending through an opening 23 in the lower end of hanger 15. The outer end of the hose is provided with an angle cock C, projecting forwardly of hanger 15.

The lower end of hanger 15 has a lateral projection 24 provided at its outer end with a forward extension 25 with an arcuate surface disposed to contact the coupler guard arm 6 when the coupler swings towards the hanger, as indicated in Figure 1. Spaced transversely of the hanger are stop lugs 26 integral with or applied to the end sill and adapted to engage the rearwardly extending rib 15a of the hanger to limit swinging movement of the hanger.

With this arrangement it is possible to use A. A. R. standard location of angle cock with A. A. R. standard air brake hose connection to an adjacent vehicle without danger of the hose connection being drawn taut and uncoupled upon extreme lateral movement of the coupler on curved track and without requiring so much slack as would result in the hose connection dragging on the road bed, particularly when not attached to the adjacent vehicle, but free to swing from the supporting bracket. By using standard length of hose connection, replacement can be made in any railway shop without the necessity of stocking special parts, as would be necessary if the wide swing of the coupler would require an extra length of hose. When the coupled cars are on a curve, one of the hangers 15 will be at the inside of the curve and one of the hangers will be at the outside of the curve. As the couplers swing toward the inside of the curve the hanger at the inside of the curve will be contacted by the associated coupler and moved laterally by the coupler. As such movement increases, the hose connection between the cars will swing the corresponding hanger on the other car inwardly of the curve.

The details of the construction may be varied substantially without departing from the spirit of the invention and the exclusive use of those modifications coming within the scope of the claims is contemplated.

What is claimed is:

1. In combination with a railway vehicle end framing and a coupler supported from the framing for swinging movement transversely of the vehicle in opposite directions from a normal centered position, a hanger suspended from the framing at a point spaced from the longitudinal center line of the framing a less distance than the range of movement of said coupler transversely of the vehicle from said center line, and a train air conduit carried by said hanger and movable therewith transversely of the vehicle in opposite directions from its normal position when the coupler is centered, said hanger having a laterally projecting element disposed to contact the side of the coupler head, following initial movement of the coupler head from its normal position towards the air conduit, and swing the hanger with the coupler throughout continued movement of the coupler head in the same direction.

2. A structure as specified in claim 1 in which the coupler engaging element projects beyond the conduit to prevent the conduit carried by the hanger from contacting the coupler.

3. A combination as specified in claim 1 in which the conduit extends lengthwise of the vehicle end framing beyond the hanger and is provided with an angle cock forwardly of the hanger and including a handle projecting from the remainder of the angle cock, and the coupler engaging element on the hanger extends forwardly of the hanger and alongside the angle cock to prevent contact of the latter with the coupler.

4. In combination with a railway vehicle end framing including a member forming a forwardly opening pocket, a coupler received in said pocket and movable transversely thereof in opposite directions from a normal centered position to accommodate the travel of the coupler on curved track, a hanger pivotally suspended from a point on the framing above the level of said pocket so as to swing transversely of the vehicle in opposite directions from its normal position when the coupler is centered, there being interengaging stop elements on the hanger and the end framing limiting the swinging movement of the hanger, and a train line hose connection carried by the swinging end of said hanger at the side of said hanger facing away from said pocket forming member.

5. In combination with a railway vehicle end framing having a coupler striking plate and a coupler supported from the framing for swinging movement transversely of the vehicle in opposite directions from a normal centered position and provided with a horn for engaging the striking plate, a hanger suspended from the framing at a point spaced above the level of the top of the coupler horn and spaced from the center of the framing less distance than the range of movement of said coupler transversely of the vehicle from its normal centered position, and a train air conduit carried by said hanger and movable therewith transversely of the vehicle in opposite directions from its normal position when the coupler is centered.

6. In combination with a railway vehicle end framing having a laterally swinging coupler mounted thereon and projecting therefrom, a rigid train line piping terminating at the rear of said coupler and fixedly supported from said framing, a hanger pivotally suspended from the forward portion of said framing to swing transversely of the vehicle, a flexible hose connected to the end of said piping and supported by the lower portion of said hanger and provided with slack between said piping and hanger, and an intervehicle hose connection connected to the outer end of said first-mentioned hose and suspended from said hanger.

7. In combination with a railway vehicle end framing including a member forming a forwardly opening pocket, a coupler received in said pocket and movable transversely thereof to accommodate the travel of the coupler on curved track, a bracket on said end framing at the side of said pocket and above the level thereof and projecting forwardly from said end framing, a stop element on said end framing below said bracket, a hanger pivotally suspended from said bracket and provided below its pivot with a part facing in one direction and disposed to engage said stop element, and also provided with a part facing in the other direction and disposed to engage the side of said coupler.

8. In combination with a railway vehicle end framing, a member forming a forwardly opening coupler-receiving pocket, a bracket on said end framing extending forwardly beyond the forward end of said pocket and including top and side walls and forming a downwardly opening recess, a hanger having a cup-like upper end received in said recess, a pivot pin extending through said hanger upper end and said bracket side walls, said cup-like upper end being provided with absorbent fibrous material surrounding said pin, and an air conduit carried by the lower end of said hanger at one side of said pocket.

References Cited in the file of this patent
UNITED STATES PATENTS

| | | |
|---|---|---|
| 2,302,129 | Lee | Nov. 17, 1942 |
| 2,411,735 | King | Nov. 26, 1946 |